United States Patent
Quaroni et al.

(10) Patent No.: US 8,669,980 B1
(45) Date of Patent: Mar. 11, 2014

(54) PROCEDURAL METHODS FOR EDITING HIERARCHICAL SUBDIVISION SURFACE GEOMETRY

(75) Inventors: Guido Quaroni, San Rafael, CA (US); Najeeb Tarazi, San Francisco, CA (US); Andrew Dayton, El Sobrante, CA (US)

(73) Assignee: Pixar, Emeryville, CA (US)

( * ) Notice: Subject to any disclaimer, the term of this patent is extended or adjusted under 35 U.S.C. 154(b) by 468 days.

(21) Appl. No.: 12/969,919

(22) Filed: Dec. 16, 2010

(51) Int. Cl.
*G06T 17/20* (2006.01)

(52) U.S. Cl.
USPC .......................................... 345/423; 345/420

(58) Field of Classification Search
USPC .................................. 345/420, 423
See application file for complete search history.

(56) References Cited

U.S. PATENT DOCUMENTS

| | | | |
|---|---|---|---|
| 6,108,006 A * | 8/2000 | Hoppe | 345/423 |
| 2003/0052875 A1* | 3/2003 | Salomie | 345/419 |
| 2005/0168463 A1* | 8/2005 | Sepulveda | 345/423 |
| 2005/0259101 A1* | 11/2005 | Westgaard et al. | 345/420 |
| 2008/0246767 A1* | 10/2008 | Shen et al. | 345/423 |

* cited by examiner

*Primary Examiner* — Maurice L McDowell, Jr.
(74) *Attorney, Agent, or Firm* — Kilpatrick Townsend & Stockton LLP

(57) ABSTRACT

Methods and techniques are provided for procedurally editing hierarchical subdivision surfaces. A procedure set and a parameter set may be received. The procedure set may include one or more produces for generating detail coefficients. The parameter set may include one or more parameters, such as granularity and sharpness, while further specifying deltas or other jitter in parameter values or locations. A hierarchical subdivision surface description can be generated based on a mesh, the procedure set, and the parameter set.

26 Claims, 8 Drawing Sheets

PROCEDURAL METHODS FOR EDITING HIERARCHICAL SUBDIVISION SURFACE GEOMETRY

BACKGROUND

This disclosure relates to computer-generated imagery (CGI) and computer-aided animation. More specifically, this disclosure relates to techniques for creating and editing hierarchical subdivision surface geometry for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Interactive editing is of great importance for creating geometric models for a variety of applications, ranging from mechanical design to movie character creation. Often times, modeling begins with an existing object on which the user performs a sequence of editing operations that lead to a desired shape. Subdivision surfaces are a known modeling tool used in computer graphics that allow a user to begin, for example, with a polygonal base mesh and continuously divide the base mesh according to subdivision rules until continuous "smooth" surface results. Thus, subdivision surfaces define smooth curves or surfaces as the limit of a sequence of successive refinements that provide finer details to the mesh without having to add more geometry. Subdivision surfaces are increasing in popularity as a modeling tool, in part because these surfaces combine the benefits of both polygonal and NURBS modeling. Subdivision surfaces allow users to model smooth surfaces by manipulating a small set of control vertices.

Accordingly, what is desired is to solve one or more of the problems relating to creating and editing hierarchical subdivision surface geometry for use in CGI and computer-aided animation, some of which may be discussed herein. Additionally, what is desired is to reduce some of the drawbacks relating to creating and editing hierarchical subdivision surface geometry for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In one embodiment, a computer-implemented method for procedurally editing hierarchical subdivision surface geometry can include receiving, at one or more computer systems, information identifying a mesh. Information is also received defining one or more parameters in a parameter set. Information is also provided specifying one or more procedures in a procedure set. A hierarchical subdivision surface description can then be generated based on the mesh, the parameters set, and the procedure set. The hierarchical subdivision surface description can be stored in a storage device associated with the one or more computer systems for subsequent use in generating a surface, rendering a surface, sculpting a mesh, painting a mesh, or the like.

In some embodiments, receiving information defining one or more parameters in the parameter set can include receiving information specifying surface granularity. In one aspect, surface granularity can include the number of subdivision or times that a particular subdivision algorithm should be applied as well as spatial information. Receiving information defining one or more parameters in the parameter set can also include receiving information specifying how surface granularity varies across a surface.

In further embodiments, receiving information defining one or more parameters in the parameter set can include receiving information receiving information specifying sharpness of a crease or corner associated with a surface. In one aspect, sharpness can include how resistant an element of a mesh is to smoothing resulting in the element being deformed less through a subdivision process. Receiving information defining one or more parameters in the parameter set can include receiving information specifying how sharpness of a crease or corner associated with a surface varies across the crease or corner.

In still further embodiments, receiving information defining one or more parameters in the parameter set can include receiving information specifying displacement of one or more elements associated with a surface. Receiving information defining one or more parameters in the parameter set can further include receiving information specifying how displacement of one or more elements associated with a surface varies across the surface.

In various embodiments, receiving information defining one or more procedures in the procedure set can include receiving a spline function, a curvature function, or other noise or randomization function.

In some embodiments, generating the hierarchical subdivision surface description based on the mesh, the parameter set, and the procedure set can include generating information that parameterizes one or more parameters in the parameter set across a plurality of elements associated with the mesh. Accordingly, parameters such as sharpness and displacement (an variations thereof) can be distributed across an entire entity. In further embodiments, generating the hierarchical subdivision surface description based on the mesh, the parameter set, and the procedure set can include generating information that smoothes one or more transitions between a first variation of a parameter in the parameter set and a second variation in the parameter.

In at least one aspect, a hierarchical subdivision surface description generated according to the parameter set and the procedure set can include information identifying the mesh, information identifying a set of elements associated with the mesh, and information specifying a set of detail coefficients. At least one surface may be then generated based on the hierarchical subdivision surface description. In further aspects, one or more additional actions may be performed on a surface generated based on the hierarchical subdivision surface description, such as rendering, animating, painting, sculpting, or the like.

In at least one embodiment, a non-transitory computer-readable medium storing computer-executable code for procedurally editing hierarchical subdivision surface geometry is contemplated. The computer-readable medium can include code for receiving information identifying a mesh, code for receiving information defining one or more parameters in a parameter set, code for receiving information specifying one or more procedures in a procedure set, and code for generating a hierarchical subdivision surface description based on the mesh, the parameters set, and the procedure set. Other computer systems, software programs, design and animation tools, are contemplated that incorporate the disclosed techniques for procedurally editing hierarchical subdivision surface geometry.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

This disclosure relates to computer-generated imagery (CGI) and computer-aided animation. More specifically, this disclosure relates to techniques for creating and editing hierarchical subdivision surface geometry for use in CGI and computer-aided animation.

Figure 1:
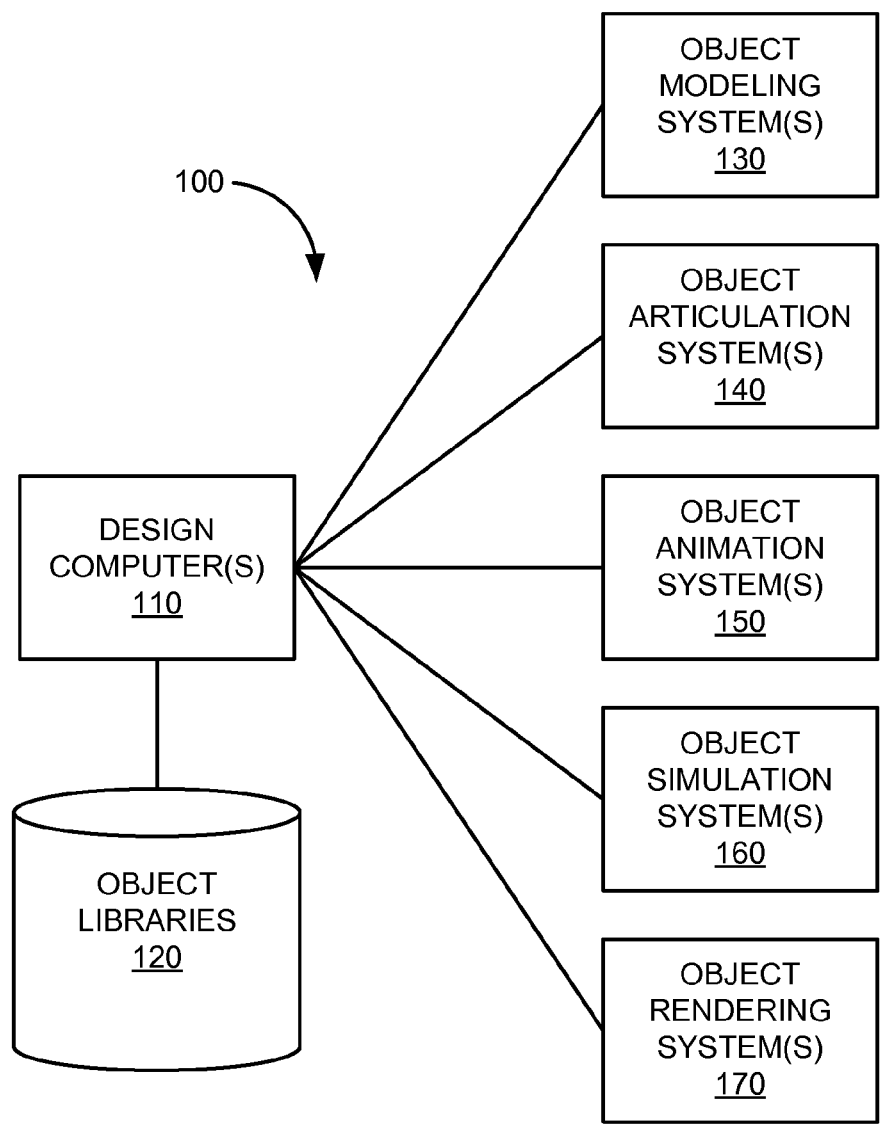
FIG. 1 is a simplified block diagram of a system for creating computer graphics imagery (CGI) and computer-aided animation that may implement or incorporate various embodiments or techniques for editing hierarchical subdivision surface geometry.

FIG. 1 is a simplified block diagram of system 100 for creating computer graphics imagery (CGI) and computer-aided animation that may implement or incorporate various embodiments or techniques for editing hierarchical subdivision surface geometry. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., depicting motion and position of an object over time) for use by other elements of system 100 or that can be stored in object library 120. The one or more object rendering systems 170 may be configured to allow a user to associate additional information or metadata with all or a portion of the rendered image.

Editing Hierarchical Subdivision Surface Geometry

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for editing hierarchical subdivision surface geometry.

In the production of computer-generated objects, for example, a 3D model may be comprised of interconnecting polygons, such as triangles or quadrilaterals, however, other types of polygons may be used. Groups of polygons associated with the model may be organized into one or more meshes. In some approaches, details and structure may provided by adding additional geometry to the 3D model. The additional geometry then may need to be manually manipulated to create fine details or the like. Alternatively, additional geometry may be procedurally processed to achieve a desired effect or randomization. However, this additional geometry may make the model more difficult to work with.

In the past few years, there have seen considerable advances in subdivision theory and many common NURBS operations have been translated into the subdivision setting. Subdivision theory, parametric evaluation, and applications such as interactive editing, trimming, boolean operations, and geometry compression have contributed to the increasing popularity of multiresolution subdivision surfaces. Accordingly, details and effects may be created without adding additional geometry or structures to an object. To date, subdivision surfaces have been used in commercial modelers (e.g., Alias/Wavefront's Maya, Pixar's Renderman, Nichimen's Mirai, and Micropace's Lightwave 3D) and are currently making their way through in game engines and hardware implementations.

Subdivision algorithms can be attractive because of their conceptual simplicity and efficiency with which they can generate smooth surfaces starting from arbitrary meshes. Polygons which have not been subdivided make up a "base mesh". One or more base meshes can then define an initial subdivision surface for a 3D model where each polygon in the initial subdivision surface can be subdivided one or more times. By increasing the number of polygons that make up a 3D model, the granularity (or resolution) of the 3D model increases. Multiresolution subdivision surfaces can offer additional flexibility by allowing modeling of details at different resolution levels and ensuring that fine-scale edits blend naturally with coarse shape deformations.

In various embodiments, subdivision surfaces can be defined recursively. A refinement scheme can be applied to a base mesh which takes all or a portion of the mesh and subdivides it. This can create new elements of the mesh, such as vertices, edges, and faces. Typically, positions of new vertices can be computed based on positions of nearby old vertices. In some refinement schemes, positions of old vertices might also be altered (possibly based on positions of new vertices).

As a result, a mesh or portion of a mesh is produced that is denser than the original one. In other words, the mesh contains more polygonal faces. The resulting mesh can be passed through the same or another refinement scheme again and so on creating various hierarchies of subdivision surfaces. Theoretically, the limit subdivision surface is the surface produced from this process being iteratively applied infinitely many times. In practical use however, only a limited number of times may be needed to produce a desired result.

In various embodiments, subdivision surfaces may be used when modeling architectural pieces (e.g., tables, chairs, room accessories, fixtures, or the like), creases, dents, or other defects in represented materials (e.g., metal or plastic), or even in environmental materials (e.g., such as representing footprints in snow). Often, providing desired details or effects on these surfaces such as representing dented or broken up corners or edges of tables and chairs can be too difficult to do with shading and displacement. Additionally, there is nothing on which to paint. Therefore, in various embodiments, techniques are provide for procedurally editing hierarchical subdivision surface geometry. In some aspects, this can provide the desired detail or effect without additional geometry or complex structures. In other aspects, the subdivision surfaces provide the structure for painting on the mesh.

Figure 2:
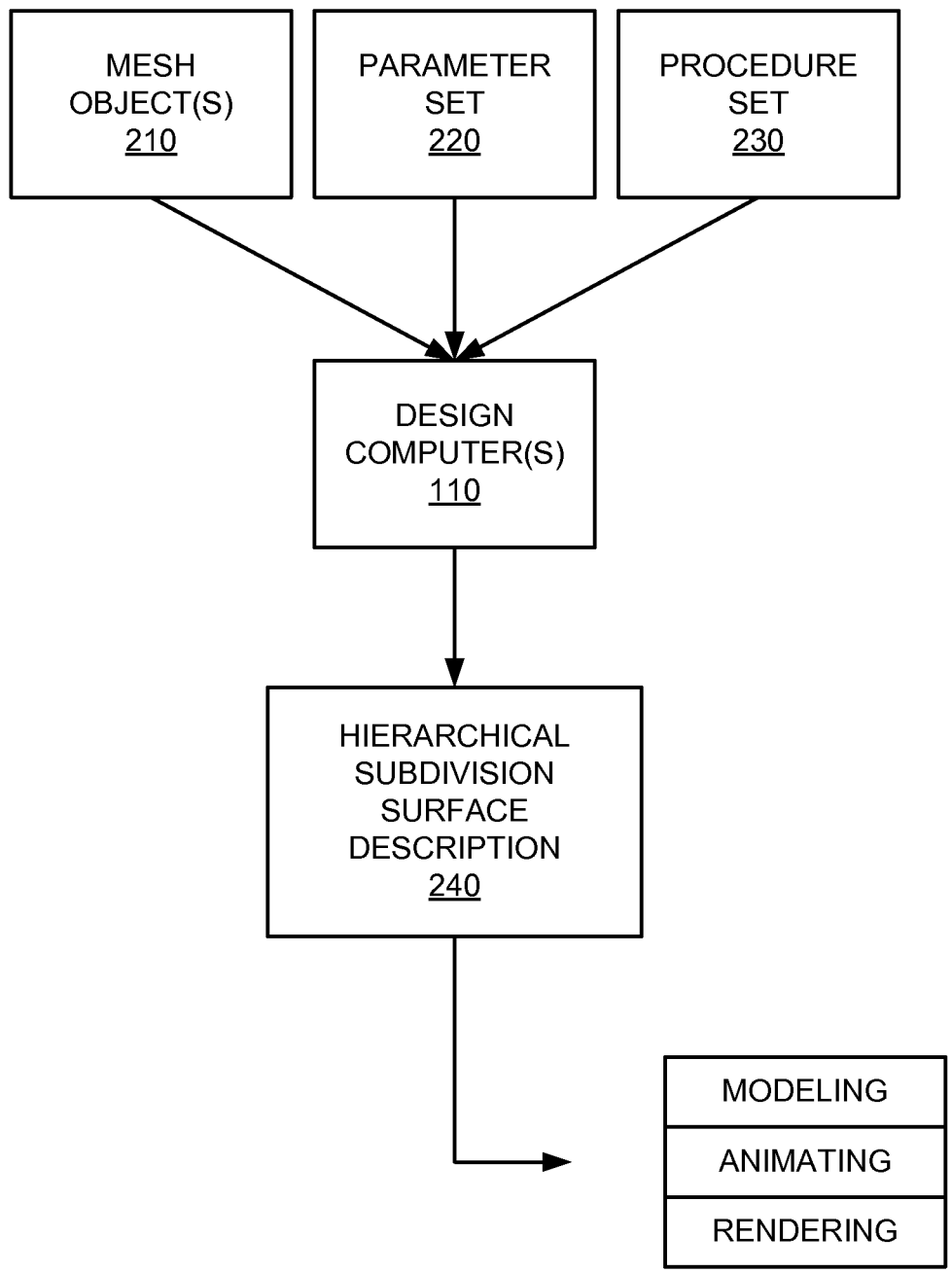
FIG. 2 is an illustration of various steps in editing hierarchical subdivision surface geometry that may be implemented using the system of FIG. 1.

FIG. 2 is an illustration of various steps for procedurally editing hierarchical subdivision surface geometry that may be implemented using system 100 of FIG. 1. In some embodiments, a process for procedurally editing hierarchical subdivision surface geometry may start with a given polygonal mesh (e.g., one or more mesh objects 210), one or more parameters (e.g., parameter set 220), and one or more procedures(e.g., procedure set 230). Based on the inputs, design computer 110 can generate hierarchical subdivision surface description 240 which includes information sufficiently describing one or more subdivision surfaces associated with mesh object 210. Hierarchical subdivision surface description 240 can be used in a variety of tasks, such as modeling, animating, rendering, or the like.

Figure 3:
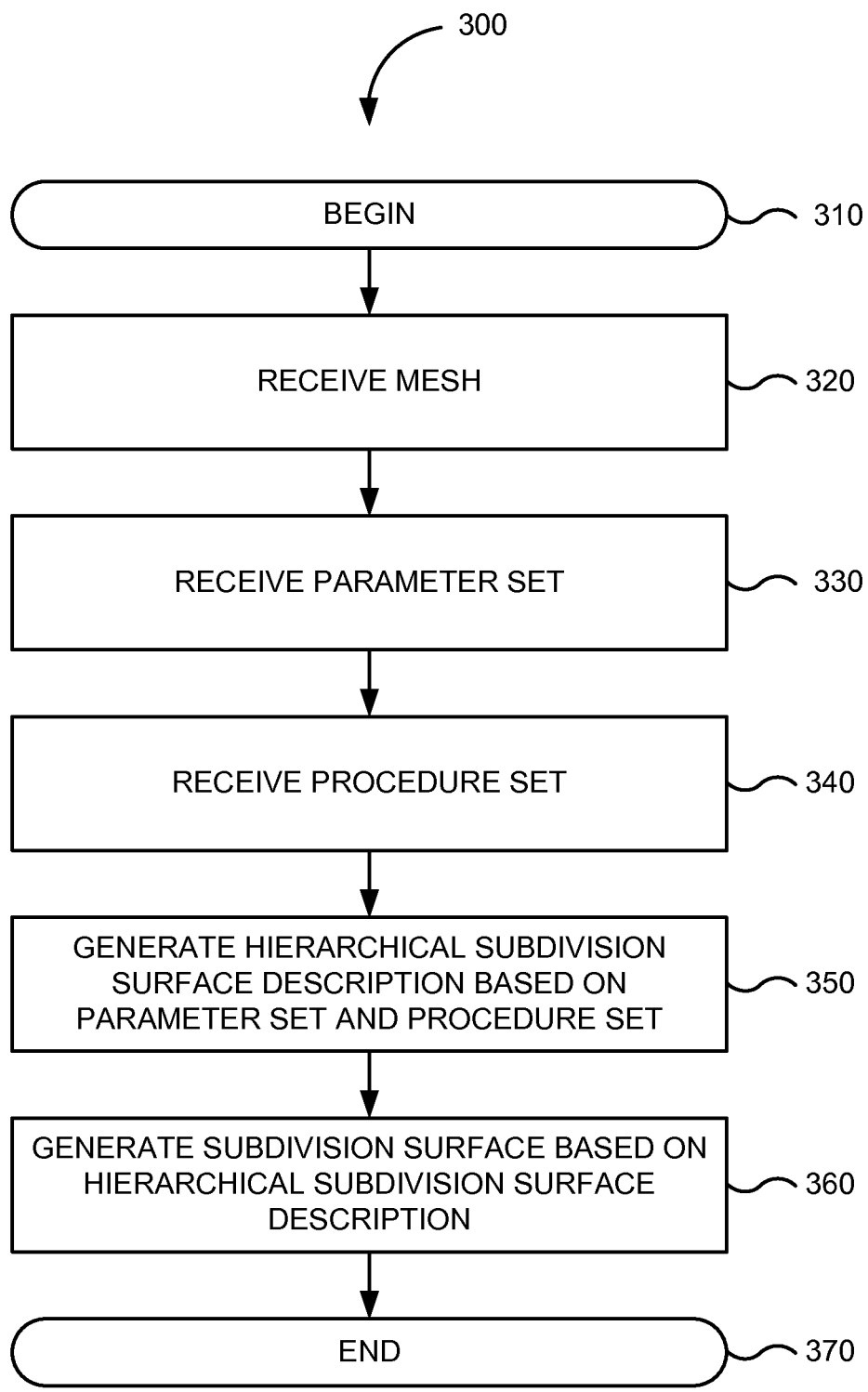
FIG. 3 is a flowchart of a method for editing hierarchical subdivision surface geometry in one embodiment.

FIG. 3 is a flowchart of method 300 for procedurally editing hierarchical subdivision surface geometry in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, information specifying or defining a mesh is received. For example, a user of design computer 110 may construct, define, build, import or otherwise specify or define a mesh. A mesh may form a grid (e.g., either structured or unstructured) and generally includes a collection of one or more elements such as vertices, edges, faces, or the like. The collection of elements defines the shape of an object (e.g., a polyhedral in 3D computer graphics and solid modeling). Typically, faces of a mesh consist of triangles, quadrilaterals, or other simple convex polygons that simplify rendering. A mesh may consist of more general concave polygons, polygons with holes, etc.

Figure 4A:
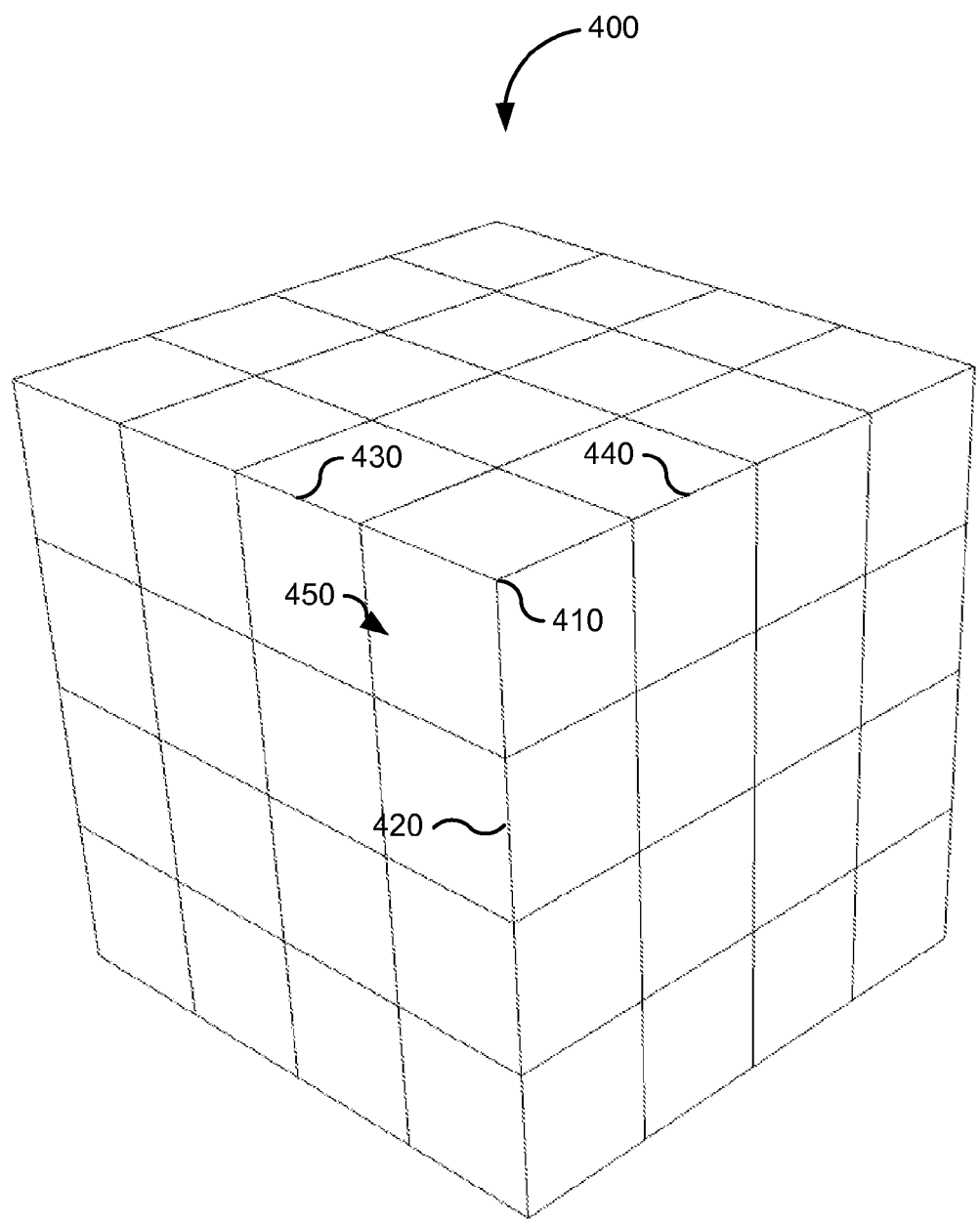
FIG. 4A is an illustration of various elements of a mesh that may be used with embodiments or techniques of the disclosure.
Figure 4B:
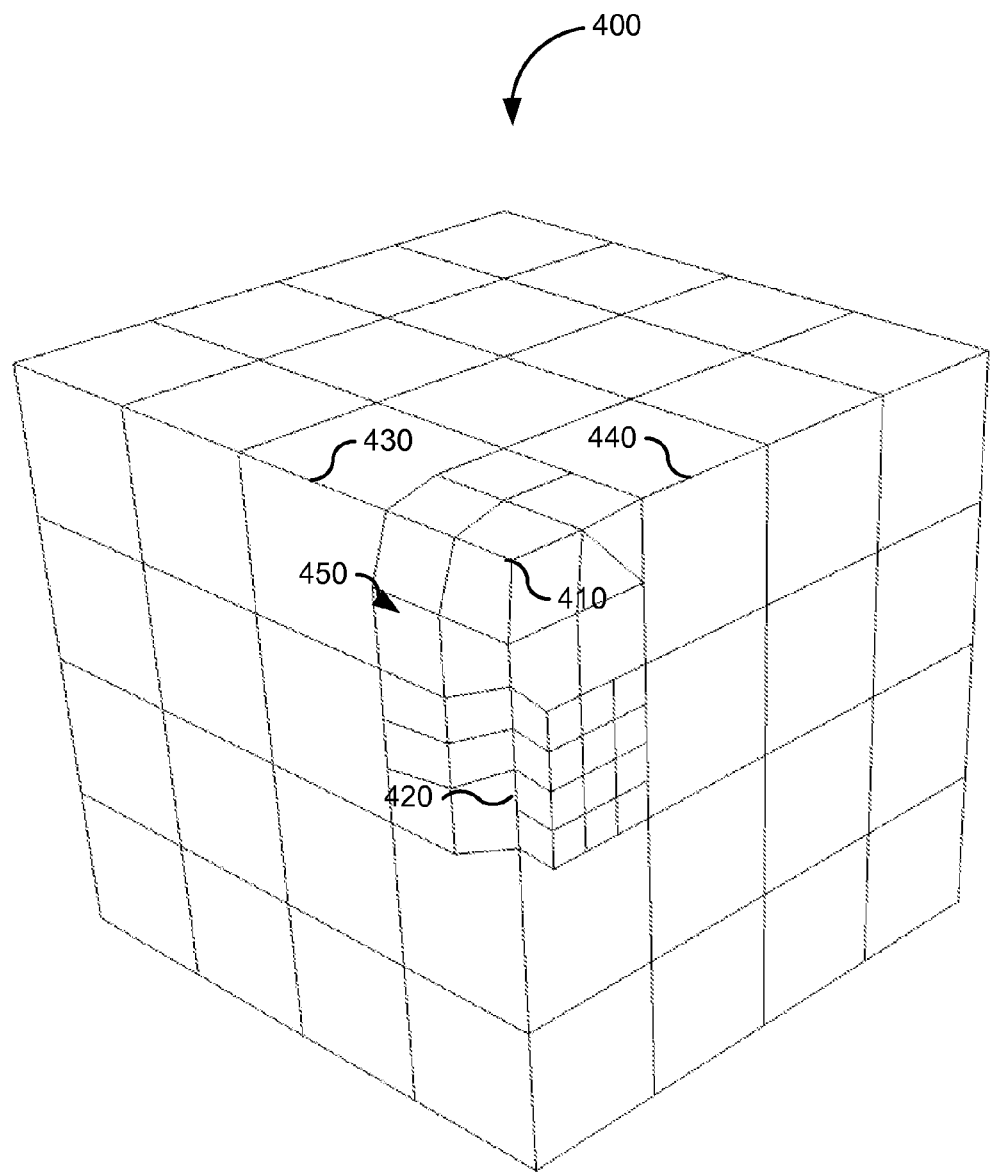
FIG. 4B is an illustration of various elements of a mesh with additional geometry generated with embodiments or techniques of the disclosure.

FIG. 4A is an illustration of various elements of mesh 400 that may be used with embodiments or techniques of the disclosure. In this example, mesh 400 forms the shape of a cube. Mesh 400 includes one or more vertices (e.g., vertex 410), one or more edges (e.g. edges 420, 430, and 440), and one or more faces (e.g., face 450). FIG. 4B is an illustration of various elements of mesh 400 with additional geometry generated with embodiments or techniques of the disclosure.

Returning to FIG. 3, in step 330, a parameter set is received. In various embodiments, a parameter set may include a set, listing, or ordering of parameters or properties. These parameters or properties may be divided into different groups or types, such as those associated with a mesh, with one or more procedures, or with one or more predetermined subdivision procedures or algorithms that may be used to generate a subdivision surface. In one embodiment, a user of design computer 110 may interact with one or more user interfaces to specify or define parameter information.

In some embodiments, a parameter set may include information identifying one or more entities associated with a mesh. An entity can include a feature of a mesh, such as a vertex, edge, face, surface, volume, or the like. A user of design computer 110 may tag or select individual features of mesh 400 or a plurality of features of mesh 400. Tagged or selected elements may be grouped together and treated as a single entity. In one aspect, one or more edges of a mesh may be grouped or included in a selection set and referred to as an edge chain.

In further embodiments, a parameter set may include one or more parameters. For example, a user of design computer 110 may provide information relevant to the resolution or granularity of a resulting surface. A parameter set may include one or more parameters that are spatially varying, temporally varying, or the like. A parameter in the parameter set may define surface granularity that specify how many subdivisions (or iterations of a particular subdivision algorithm) are desired for a particular entity. In another example, surface granularity can specify spatial granularity where a user is not concerned with the number of iterations or divisions performed on an entity but that, for example, each subdivision be spatially similar (e.g., that a first division be a predetermined distance from one another).

In yet another example, a parameter in the parameter set may specify how the resolution or granularity of a resulting surface varies across the resulting surface. Variation may include how granularity varies across a single entity of a mesh or how granularity varies between two or more entities of a mesh. Accordingly, one or more parameters may be specified that influence the resolution or granularity of the resulting surface.

In still another example, a parameter in the parameter set may define sharpness in a resulting surface, such as the strength of a crease or corner. In general, sharpness can dictate how likely a crease or corner is to deform under a subdivision process. In one aspect, an edge, crease, or corner can be weighted to change the way mesh geometry is subdivided providing a more smooth or sharp appearance. For example, a higher value for a strength weight can make an edge "stronger" and more resistant to smoothing and thus be deformed less. In another example, a lower value a strength weight can make an edge "weaker" and less resistant to smoothing.

In yet another example, a parameter in the parameter set may specify how sharpness in a resulting surface varies across the resulting surface. For example, one edge chain may have a different sharpness that that of another edge chain. In another example, sharpness may vary within or along an edge chain. Accordingly, one or more parameters may be specified that influence the sharpness in of the resulting surface.

In still another example, a parameter in the parameter set may define displacement in a resulting surface. In general, displacement can dictate how an element of a mesh is to deform or be displaced in a subdivision process. In one aspect, an entity (e.g., a point, vertex, edge, face, etc.) can be weighted to change how much the entity is displaced from its original or current location. In yet another example, a parameter in the parameter set may specify how displacement in a resulting surface varies across the resulting surface. For example, one edge chain may have a different displacement that that of another edge chain. In another example, displacement may vary within or along an edge chain. Accordingly, one or more parameters may be specified that influence the displacement in the resulting surface.

Other parameters are contemplated that define any information needed by one or more predetermined functions configured to generated hierarchical subdivision surface descriptions based on the information.

Figure 5:
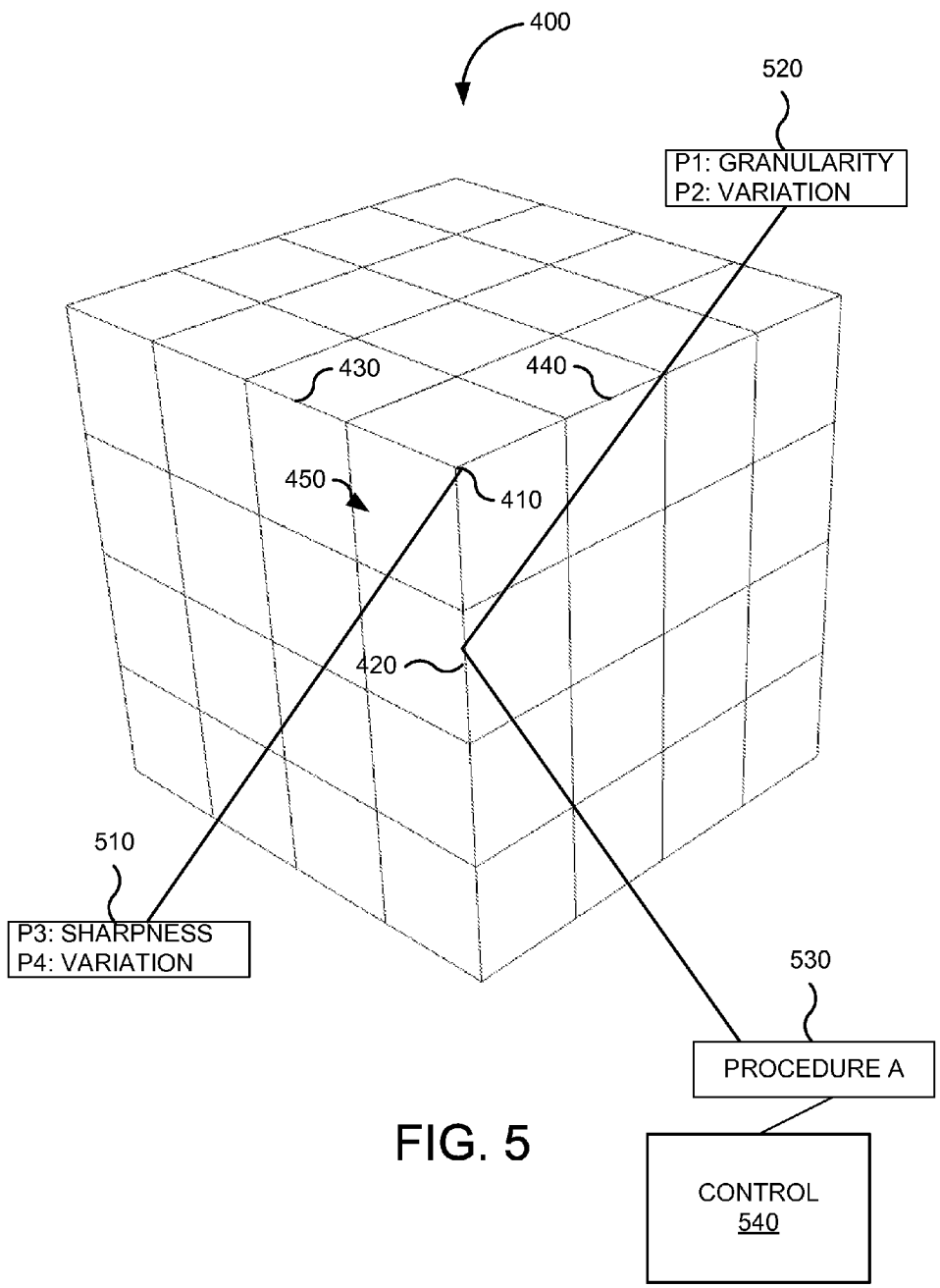
FIG. 5 is an illustration of various parameters that may form part of a parameter set for generating hierarchical subdivision surface descriptions.

FIG. 5 is an illustration of various parameters that may form part of a parameter set for generating hierarchical subdivision surface descriptions. In this example, parameter set 510 may be received for specifying one or more parameters applicable to vertex 410. For example, parameter set 510 may include a sharpness parameter (and any associated values) indicative of how sharp the portion of mesh 400 appears relative to vertex 410 when subdivision geometry is added to mesh 400. Parameter set 510 may further specify a sharpness variation parameter indicative of how sharpness may vary at or near vertex 410.

Parameter set 520 may be received for specifying one or more parameters applicable to edge 420. For example, parameter set 520 may include a granularity parameter (and any associated values) indicative of, for example, how many subdivisions are desired of mesh 400 relative to edge 420 when subdivision geometry is added to mesh 400. Parameter set 520 may further specify a granularity variation parameter indicative of how granularity may vary at, near, or along edge 420.

Returning again to FIG. 3, in step 340, a procedure set is received. In various embodiments, a procedure set may include a set, listing, or ordering of procedures. These procedures may be associated with the mesh, one or more parameters or properties in the parameter set, or with one or more subdivision algorithms. In one embodiment, a user of design computer 110 may interact with one or more user interfaces to specify or define procedure information.

In various embodiments, a procedure in the procedure set may specify how to generate the details of one or more subdivision surfaces using parameters in one or more parameters sets. In one example, a procedure in the procedure set may drive or influence how the resolution or granularity of a resulting surface varies across the resulting surface. In another example, one or more of a spline function, curvature function, noise function, random function, etc. may be used to determine where a parameter is applied and/or how much of a parameter is applied. For example, procedure set 530 of FIG. 5 may specify how to generate details of one or more subdivision surfaces using parameters of parameter set 520 for edge 420. Control 540 may be associated with procedure set 530 and used to determine where a procedure/parameter is applied and/or how much of a procedure/parameter is applied. Manipulation of control 540 may influence how to generate the details of one or more subdivision surfaces.

In step 350, one or more hierarchical subdivision surface descriptions are generated. A hierarchical subdivision surface description includes information for generating one or more hierarchical subdivision surfaces. In some embodiments, a hierarchical subdivision surface description is generated that includes a description of a mesh, one or more mesh element tags or other information identifying one or more elements of the mesh, and detail coefficients. Detail coefficients include information for generating the details of the one or more hierarchical subdivision surfaces. In various embodiments, the detail coefficients include specific values associated with parameters in the parameters set as determined in response to applying procedures in the procedure set. The specific or flatted values can include which elements of a mesh should be displaced and by how much, sharpness, granularity, etc.

Accordingly, the detail coefficients of subdivision surfaces can be procedurally generate improving the development and production process.

In step 360, one or more subdivision surfaces are generated based on the one or more hierarchical subdivision surface descriptions. The surfaces may be rendered for display, animated, further edited, or form part of other processes and pipelines. FIG. 4B is an illustration of various elements of 400 mesh with additional geometry. Method 300 of FIG. 3 ends in step 370.

In various aspects and application, a user of design computer 110 may utilize the MAYA computer graphics program to model a car door. In one aspect, the user can create one or more high level structures on the model that represent one or more desired dents or defects.

For example, the user may introduce one or more spans to represent the dent. In another aspect, a user may create an irregularity or one or more irregularities in the mesh representing the car door that correspond to the dents.

In a further aspect, the user may create one or more crease set. In particular, a user may select which edges that correspond to the dent and create one or more groups. The user then may apply noise to an edge or crease set specifying granularity (subdivide to that level), sharpness, amplitude in the variation of granularity/sharpness, etc. In some examples the user may specify falloff at one or more given edges in that parameters transition from selected noise parameters to nothing. The user then may select render and see any results in response to a hierarchical subdivision surface description generated based on specified parameters and procedures.

Accordingly, in various embodiments, techniques are provided for procedurally generating detail coefficients for edges, vertices, faces, or the like. These techniques can apply to any type of hierarchical edit and may be applied to texture coordinates, hierarchical edits, scalar fields, etc. Additionally, these techniques provide for procedurally varying detail coefficients for hierarchical subdivision surfaces.

In further embodiments, one or more techniques are incorporated for ensuring that parameters in the parameters set apply across elements of a mesh designated as a single entity. Furthermore, transitions between entities may be smoothed.

Figure 6:
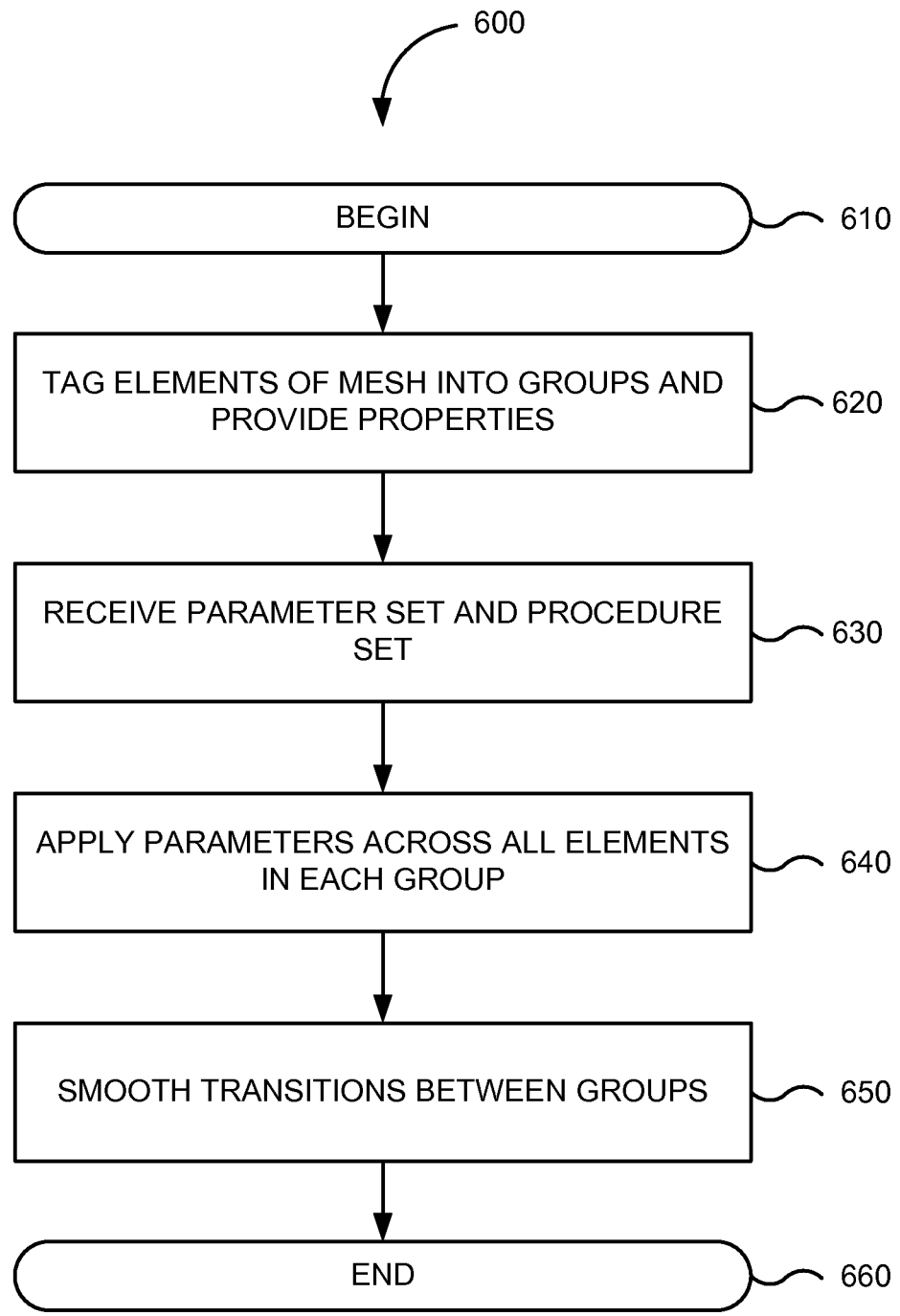
FIG. 6 is a flowchart of a method for generating hierarchical subdivision surface descriptions based on a mesh and a parameter set in one embodiment.

FIG. 6 is a flowchart of method 600 for generating hierarchical subdivision surface descriptions based on a mesh and a parameter set in one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, elements of a mesh are tagged into groups. For example, a user may select vertices, edges, faces, etc. and identify groups of elements. Elements may be collected into selection sets. In various embodiments, data may be provided on the selection sets. For example, a user may associate one or more properties (e.g., parameters and/or their values) with the tags or groups. In one aspect, a tag or group may include a plurality of elements such that properties apply across the entire entity.

In step 630, a parameter set and procedure set are received. Accordingly, any data needed for one or more predetermined function configured to create hierarchical subdivision surface descriptions is obtained from the tags or groups, their associated properties, and any user-specified information that drives or controls parameters in the parameter set. In one example, a parameter set is generated to include sets or lists of elements or groups associated with a mesh, parameters associated with data stored on the mesh proving properties of the mesh, and any function or procedure parameters as discussed above.

In step 640, a hierarchical subdivision description is generated by applying all properties or parameters across all elements in a tag or group. Accordingly, each parameter is parameterized across each individual entity, even if the entity includes multiple elements (e.g., edges) of a mesh. In one embodiment, a parameter set may include an entity formed by a plurality of elements associate with a mesh. In generating hierarchical subdivision surface descriptions, the entire entity may be parameterized for each parameter in the parameter set. For example, an edge chain may include all or a portion of one edge and all or a portion of another edge. The entire edge chain may be parameterized such that granularity, sharpness, etc. is compensated across the entire edge chain. Accordingly, parameters such as granularity and sharpness are maintained within subdivision surfaces along the edge chain continuity.

In step 650, transitions may be smoothed between groups. For example, transitions between areas of greater noise and areas of lesser noise may be smoothed. In another example, transitions between areas of greater granularity and areas of lesser granularity may be smoothed. In yet another example, transitions between areas of differing sharpness, displacement, etc. may be smoothed. FIG. 6 ends in step 660.

Accordingly, hierarchical subdivision surface descriptions can be provided to a render, modeling system for further editing, animating system, etc. that have been procedurally generated. In various embodiments, objects, details, or other desired effects such as worn architectural pieces, twisted metal, footprints, may be quickly and more efficiently generated. In one aspect, techniques provided can be applied to breaking up silhouettes on edges—taking a clean edge and making the edge unclean. Thus, architecture pieces can be built more readily that do not look like they are identically spit out of a machine.

In some variations, hierarchical subdivision surface descriptions may be created by code executed during shading rather than at rig time, for example, as spline is being created such that detail coefficients are generated on the fly. Accordingly, data provided by artists may be used to set detail coefficients.

Figure 7:
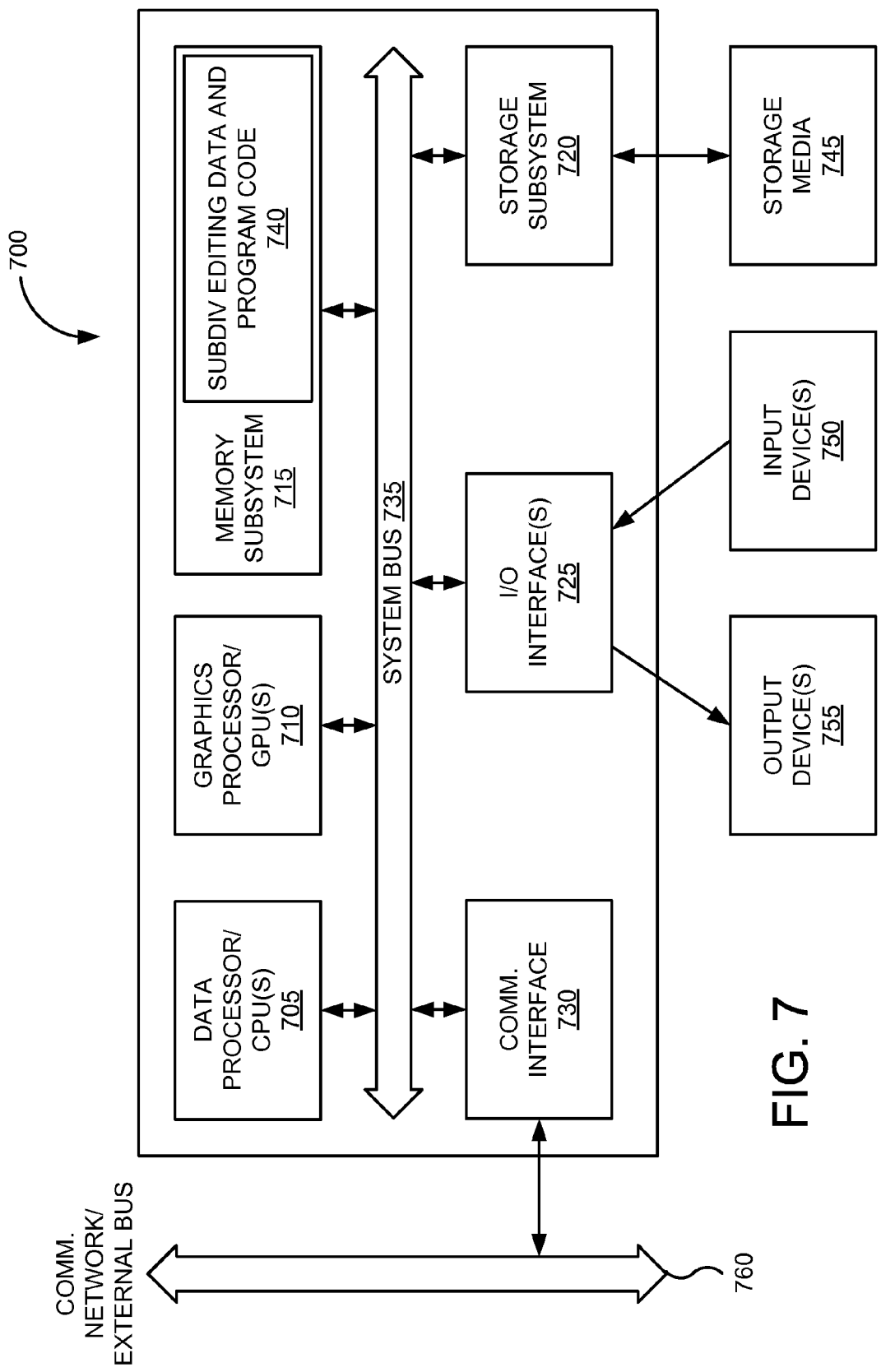
FIG. 7 is a block diagram of a computer system or information processing device that may incorporate an embodiment, be incorporated into an embodiment, or be used to practice any of the innovations, embodiments, and/or examples found within this disclosure.

FIG. 7 is a block diagram of computer system 700 that may incorporate an embodiment, be incorporated into an embodiment, or be used to practice any of the innovations, embodiments, and/or examples found within this disclosure. FIG. 7 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 700 can include hardware and/or software elements configured for performing logic operations and calculations, input/output operations, machine communications, or the like. Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication. Computer system 700 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 705 can include hardware and/or software elements configured for executing logic or program code or for providing application-specific functionality. Some examples of CPU(s) 705 can include one or more microprocessors (e.g., single core and multi-core) or micro-controllers. CPUs 705 may include 4-bit, 8-bit, 12-bit, 16-bit, 32-bit, 64-bit, or the like architectures with similar or divergent internal and external instruction and data designs. CPUs 705 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD 64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 705 may also include one or more field-gate programmable arrays (FPGAs), application-specific integrated circuits (ASICs), or other microcontrollers. The one or more data processors or central processing units (CPUs) 705 may include any number of registers, logic units, arithmetic units, caches, memory interfaces, or the like. The one or more data processors or central processing units (CPUs) 705 may further be integrated, irremovably or moveably, into one or more motherboards or daughter boards.

The one or more graphics processor or graphical processing units (GPUs) 710 can include hardware and/or software elements configured for executing logic or program code associated with graphics or for providing graphics-specific functionality. GPUs 710 may include any conventional graphics processing unit, such as those provided by conventional video cards. Some examples of GPUs are commercially available from NVIDIA, ATI, and other vendors. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like. The one or more data processors or central processing units (CPUs) 705 may further be integrated, irremovably or moveably, into one or more motherboards or daughter boards that include dedicated video memories, frame buffers, or the like.

Memory subsystem 715 can include hardware and/or software elements configured for storing information. Memory subsystem 715 may store information using machine-readable articles, information storage devices, or computer-readable storage media. Some examples of these articles used by memory subsystem 770 can include random access memories (RAM), read-only-memories (ROMS), volatile memories, non-volatile memories, and other semiconductor memories. In various embodiments, memory subsystem 715 can include subdivision editing data and program code 740.

Storage subsystem 720 can include hardware and/or software elements configured for storing information. Storage subsystem 720 may store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMS, DVDs and bar codes, removable storage devices, networked storage devices, or the like. In some embodiments, all or part of subdivision editing data and program code 740 may be stored using storage subsystem 720.

In various embodiments, computer system 700 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 700 may also include one or more applications configured to execute, perform, or otherwise implement techniques disclosed herein. These applications may be embodied as subdivision editing data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

The one or more input/output (I/O) interfaces 725 can include hardware and/or software elements configured for performing I/O operations. One or more input devices 750 and/or one or more output devices 755 may be communicatively coupled to the one or more I/O interfaces 725.

The one or more input devices 750 can include hardware and/or software elements configured for receiving information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can include hardware and/or software elements configured for outputting information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements.

A display device or monitor may be used with computer system 700 and can include hardware and/or software elements configured for displaying information. Some examples include familiar display devices, such as a television monitor, a cathode ray tube (CRT), a liquid crystal display (LCD), or the like.

Communications interface 730 can include hardware and/or software elements configured for performing communications operations, including sending and receiving data. Some examples of communications interface 730 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 730 may be coupled to communications network/external bus 780, such as a computer network, to a FireWire bus, a USB hub, or the like. In other embodiments, communications interface 730 may be physically integrated as hardware on a motherboard or daughter board of computer system 700, may be implemented as a software program, or the like, or may be implemented as a combination thereof.

In various embodiments, computer system 700 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 700.

As suggested, FIG. 7 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method for procedurally editing hierarchical subdivision surface geometry, the method comprising:
   receiving, at one or more computer systems, information identifying a mesh;
   receiving, at the one or more computer systems, information defining one or more parameters in a parameter set;
   receiving, at the one or more computer systems, information specifying one or more procedures in a procedure set;
   generating, with one or more processors associated with the one or more computer systems, a hierarchical subdivision surface description based on the mesh, the parameters set, and the procedure set; and
   storing the hierarchical subdivision surface description in a storage device associated with the one or more computer systems.

2. The method of claim 1 wherein receiving information defining one or more parameters in the parameter set comprises receiving information specifying surface granularity.

3. The method of claim 1 wherein receiving information defining one or more parameters in the parameter set comprises receiving information specifying how surface granularity varies across a surface.

4. The method of claim 1 wherein receiving information defining one or more parameters in the parameter set comprises receiving information specifying sharpness of a crease or corner associated with a surface.

5. The method of claim 1 wherein receiving information defining one or more parameters in the parameter set comprises receiving information specifying how sharpness of a crease or corner associated with a surface varies across the crease or corner.

6. The method of claim 1 wherein receiving information defining one or more parameters in the parameter set comprises receiving information specifying displacement of one or more elements associated with a surface.

7. The method of claim 1 wherein receiving information defining one or more parameters in the parameter set comprises receiving information specifying how displacement of one or more elements associated with a surface varies across the surface.

8. The method of claim 1 wherein receiving information defining one or more procedures in the procedure set comprises receiving at least one of a spline function, a curvature function, or a noise function.

9. The method of claim 1 wherein generating the hierarchical subdivision surface description based on the mesh, the parameter set, and the procedure set comprises generating information that parameterizes one or more parameters in the parameter set across a plurality of elements associated with the mesh.

10. The method of claim 1 wherein generating the hierarchical subdivision surface description based on the mesh, the parameter set, and the procedure set comprises generating information that smoothes one or more transitions between a first variation of a parameter in the parameter set and a second variation in the parameter.

11. The method of claim 1 wherein generating the hierarchical subdivision surface description comprises generating information identifying the mesh, information identifying a set of elements associated with the mesh, and information specifying a set of detail coefficients.

12. The method of claim 1 further comprising:
generating, with the one or more processors associated with the one or more computer systems, at least one surface based on the hierarchical subdivision surface description.

13. The method of claim 1 further comprising:
performing one or more actions on a surface generated based on the hierarchical subdivision surface description.

14. A non-transitory computer-readable medium storing code executed by a processor of a computer system for procedurally editing hierarchical subdivision surface geometry, the non-transitory computer-readable medium comprising:
code for receiving information identifying a mesh;
code for receiving information defining one or more parameters in a parameter set;
code for receiving information specifying one or more procedures in a procedure set; and
code for generating a hierarchical subdivision surface description based on the mesh, the parameters set, and the procedure set.

15. The non-transitory computer-readable medium of claim 14 wherein the code for receiving information defining one or more parameters in the parameter set comprises code for receiving information specifying surface granularity.

16. The non-transitory computer-readable medium of claim 14 wherein the code for receiving information defining one or more parameters in the parameter set comprises code for receiving information specifying how surface granularity varies across a surface.

17. The non-transitory computer-readable medium of claim 14 wherein the code for receiving information defining one or more parameters in the parameter set comprises code for receiving information specifying sharpness of a crease or corner associated with a surface.

18. The non-transitory computer-readable medium of claim 14 wherein the code for receiving information defining one or more parameters in the parameter set comprises code for receiving information specifying how sharpness of a crease or corner associated with a surface varies across the crease or corner.

19. The non-transitory computer-readable medium of claim 14 wherein the code for receiving information defining one or more parameters in the parameter set comprises code for receiving information specifying displacement of one or more elements associated with a surface.

20. The non-transitory computer-readable medium of claim 14 wherein the code for receiving information defining one or more parameters in the parameter set comprises code for receiving information specifying how displacement of one or more elements associated with a surface varies across the surface.

21. The non-transitory computer-readable medium of claim 14 wherein the code for receiving information defining one or more procedures in the procedure set comprises code for receiving at least one of a spline function, a curvature function, or a noise function.

22. The non-transitory computer-readable medium of claim 14 wherein the code for generating the hierarchical subdivision surface description based on the mesh, the parameter set, and the procedure set comprises code for generating information that parameterizes one or more parameters in the parameter set across a plurality of elements associated with the mesh.

23. The non-transitory computer-readable medium of claim 14 wherein the code for generating the hierarchical subdivision surface description based on the mesh, the parameter set, and the procedure set comprises code for generating information that smoothes one or more transitions between a first variation of a parameter in the parameter set and a second variation in the parameter.

24. The non-transitory computer-readable medium of claim 14 wherein the code for generating the hierarchical subdivision surface description comprises code for generating information identifying the mesh, information identifying a set of elements associated with the mesh, and information specifying a set of detail coefficients.

25. The non-transitory computer-readable medium of claim 14 further comprising:
code for generating at least one surface based on the hierarchical subdivision surface description.

26. The non-transitory computer-readable medium of claim 14 further comprising:
code for performing one or more actions on a surface generated based on the hierarchical subdivision surface description.

* * * * *